US011986941B2

(12) United States Patent
Kadlecek et al.

(10) Patent No.: US 11,986,941 B2
(45) Date of Patent: May 21, 2024

(54) POWER TOOL, POWER TOOL ACCESSORY AND COUPLING ARRANGEMENT THEREFOR

(71) Applicant: Black & Decker Inc., New Britain, CT (US)

(72) Inventors: Daniel Kadlecek, Bischofsheim (DE); Petr Dusik, Idstein (DE); Isabell Oeffner, Roedermark (DE); Benjamin Schmidt, Mainz (DE); Stefan Sell, Mainz (DE); Rene Thieme, Riesa (DE)

(73) Assignee: Black & Decker, Inc., New Britain, CT (US)

(*) Notice: Subject to any disclaimer, the term of this patent is extended or adjusted under 35 U.S.C. 154(b) by 0 days.

(21) Appl. No.: 18/051,540

(22) Filed: Nov. 1, 2022

(65) Prior Publication Data

US 2023/0148334 A1 May 11, 2023

(30) Foreign Application Priority Data

Nov. 8, 2021 (GB) ..................................... 2116001

(51) Int. Cl.

*B25F 5/00* (2006.01)
*B25F 5/02* (2006.01)
*B25D 17/20* (2006.01)

(52) U.S. Cl.

CPC ................ *B25F 5/02* (2013.01); *B25D 17/20* (2013.01); *B25D 2217/0057* (2013.01); *B25D 2250/095* (2013.01)

(58) Field of Classification Search

CPC ................ B23Q 11/0071; B25D 17/20; B25D 2217/0057

See application file for complete search history.

(56) References Cited

U.S. PATENT DOCUMENTS

| | | | |
|---|---|---|---|
| 6,926,473 | B2 | 8/2005 | Luebke |
| 7,101,058 | B2 | 9/2006 | Prell et al. |
| 7,182,150 | B2 | 2/2007 | Grossman |
| 7,484,300 | B2 | 2/2009 | King et al. |
| 8,316,492 | B2 | 11/2012 | Barber et al. |
| 8,915,309 | B2 | 12/2014 | Kakiuchi et al. |
| 9,056,379 | B2 | 6/2015 | Yoshikane et al. |
| 9,505,095 | B2 | 11/2016 | Machida et al. |
| 9,887,576 | B2 | 2/2018 | Zhang et al. |

(Continued)

FOREIGN PATENT DOCUMENTS

| | | | |
|---|---|---|---|
| EP | 1714732 | A1 | 10/2006 |
| EP | 1872900 | B1 | 7/2012 |

(Continued)

OTHER PUBLICATIONS

European Search Report dated Apr. 18, 2023 in corresponding EP application No. 22202110.7, 7 pages.

*Primary Examiner* — Eyamindae C Jallow
(74) *Attorney, Agent, or Firm* — Rhonda Barton

(57) ABSTRACT

A power tool is provided comprising: a power source; a power tool housing comprising a first mechanical coupling connectable with a second reciprocal mechanical coupling on a power tool accessory; and a first electrical coupling in electrical connection with the power source and mounted on the first mechanical coupling. The first electrical coupling is electrically connectable with a second reciprocal electrical coupling on the power tool accessory.

20 Claims, 10 Drawing Sheets

(56) References Cited

U.S. PATENT DOCUMENTS

| | | | | |
|---|---|---|---|---|
| 11,020,846 | B2 * | 6/2021 | Kawano ................. | B25D 16/00 |
| 2002/0129949 | A1 | 9/2002 | Bongers-Ambrosius et al. | |
| 2004/0251041 | A1 * | 12/2004 | Grossman .......... | B23Q 11/0046 173/217 |
| 2005/0153596 | A1 | 7/2005 | Vanwambeke et al. | |
| 2006/0104735 | A1 | 5/2006 | Zeiler et al. | |
| 2006/0220612 | A1 | 10/2006 | Feldmann et al. | |
| 2008/0196910 | A1 | 8/2008 | Radle et al. | |
| 2015/0041166 | A1 | 2/2015 | Van der Linde et al. | |
| 2016/0354889 | A1 | 12/2016 | Ely et al. | |
| 2017/0232565 | A1 * | 8/2017 | Machida ................... | B25F 5/00 173/198 |
| 2018/0099392 | A1 * | 4/2018 | Sunabe ................ | B25D 17/043 |
| 2019/0111532 | A1 | 4/2019 | Garcia et al. | |
| 2019/0193224 | A1 | 6/2019 | Furusawa et al. | |
| 2019/0224797 | A1 | 7/2019 | Seipp et al. | |
| 2019/0381618 | A1 * | 12/2019 | Furusawa ............ | B23Q 11/127 |
| 2020/0290167 | A1 * | 9/2020 | Takeuchi ........... | B23Q 11/0071 |
| 2020/0305665 | A1 * | 10/2020 | Yoshikane ............ | A47L 9/2836 |
| 2020/0306904 | A1 * | 10/2020 | Iida ........................... | B25F 5/00 |
| 2020/0306945 | A1 * | 10/2020 | Yoshikane ............. | B25D 17/20 |
| 2020/0306946 | A1 * | 10/2020 | Takeuchi ........... | B23Q 11/0046 |

FOREIGN PATENT DOCUMENTS

| | | | |
|---|---|---|---|
| EP | 2366491 | B1 | 9/2012 |
| EP | 2390053 | B1 | 7/2015 |
| EP | 2174749 | B1 | 7/2017 |
| WO | 20180228484 | A1 | 12/2018 |

* cited by examiner

POWER TOOL, POWER TOOL ACCESSORY AND COUPLING ARRANGEMENT THEREFOR

CROSS-REFERENCE TO RELATED APPLICATIONS

This application claims priority, under 35 U.S.C. § 119, to UK Patent Application No. 2116001.5 filed Nov. 8, 2021, which is incorporated herein by reference in its entirety.

TECHNICAL FIELD

The present disclosure relates to a power tool, power tool accessory and coupling arrangement therefor. In particular, the present disclosure relates to coupling arrangement between a rotary hammer and a dust extractor.

BACKGROUND

Operation of a power tool such as a rotary hammer can often create considerable dust. This is undesirable for the user and therefore a dust extractor may be used to remove dust away from the vicinity of the rotary hammer and the user.

Some known dust extractors are mountable to the rotary hammer and are electrically connected to the power supply of the rotary hammer. The dust extractor engages with projecting electrical contacts from the surface of the housing. The projecting electrical contacts can be damaged when the rotatory hammer is placed on a surface. This means that dust extractor may not work properly when mounted on the rotary hammer.

Other known dust extractors are engageable with electrical contacts positioned in air vents of the rotary hammer. Whilst this means the electrical contacts are not damaged when the rotary hammer is place on a surface, the airflow through the rotary hammer is restricted when mounted to the dust extractor.

SUMMARY

Examples of the present disclosure aim to address the aforementioned problems.

According to an aspect of the present disclosure there is a power tool comprising: a power source; a power tool housing comprising a first mechanical coupling connectable with a second reciprocal mechanical coupling on a power tool accessory; and a first electrical coupling in electrical connection with the power source and mounted on the first mechanical coupling wherein the first electrical coupling is electrically connectable with a second reciprocal electrical coupling on the power tool accessory.

In an embodiment, the first mechanical coupling is a slot or a rail configured to couple with a rail or slot of the second reciprocal mechanical coupling.

In an embodiment, the first mechanical coupling is a slot and the second reciprocal mechanical coupling is a rail.

In an embodiment, the first mechanical coupling and comprises a first slot a first side of the power tool housing and a second slot on a second side of the power tool housing, the first slot and the second slot respectively configured to couple with a first rail of the second reciprocal mechanical coupling on the first side of the power tool housing and a second rail of the second reciprocal mechanical coupling on the second side of the power tool housing.

In an embodiment, the first electrical coupling comprises a plurality of electrical contacts configured to engage a plurality of electrical contacts of the second reciprocal electrical coupling.

In an embodiment, the plurality of electrical contacts of the first electrical coupling are mounted on the same surface of the first mechanical coupling.

In an embodiment, the plurality of electrical contacts of the second reciprocal electrical coupling are mounted on the same surface of the second reciprocal mechanical coupling.

In an embodiment, a distance between a first pair of electrical contacts on the first electrical coupling and the second reciprocal electrical coupling is different from a distance between a second pair of electrical contacts on the first electrical coupling and the second reciprocal electrical coupling.

In an embodiment, the plurality of the electrical contacts of the first electrical coupling and the second reciprocal electrical coupling are respectively mounted on a plurality of different surfaces of the first mechanical coupling and the second reciprocal mechanical coupling.

In an embodiment, the plurality of electrical contacts of one of the first electrical coupling and the second reciprocal electrical coupling are metal plates.

In an embodiment, the plurality of electrical contacts of the other of the first electrical coupling and the second reciprocal electrical coupling are metal springs.

In an embodiment, at least one of the electrical contacts is arranged to transmit data between the power tool and the power tool accessory.

In an embodiment, the power tool is one of a rotary hammer, a diamond core drill, hammer drill, a router, a reciprocating saw, plunge saw, a circular saw, an impact driver, a drill, a hammer drill, a multitool, an oscillating tool, a chipping hammer.

In an embodiment, the power source is a battery is mountable to the power tool housing.

In an embodiment, the first mechanical coupling is a slot or a rail comprising a plurality of electrical contacts mounted on the slot or rail.

In an embodiment, the second mechanical coupling is a slot or a rail comprising a plurality of electrical contacts mounted on the slot or rail.

In an embodiment, the power tool and the power tool accessory are only mechanically coupled together with the first mechanical coupling and the second mechanical coupling.

In a second aspect of the present disclosure, there is provided a power tool accessory mountable on a power tool for comprising: an accessory housing comprising a second reciprocal mechanical coupling connectable with a first reciprocal mechanical coupling on the power tool; and a second reciprocal electrical coupling mounted on the second reciprocal mechanical coupling wherein the second reciprocal electrical coupling is electrically connectable with a first reciprocal electrical coupling on power tool wherein the first reciprocal electrical coupling is in electrical connection with a power source of the power tool.

In an embodiment, the power tool accessory is one of a dust extractor, a water pump, a laser indicator, or an illumination device.

In a third aspect of the present disclosure there is provided a power tool assembly comprising: a power tool having: a power tool housing; a power source; a first mechanical coupling on the housing; and a first electrical coupling in electrical connection with the power source and mounted on the first mechanical coupling; and a power tool accessory having: an accessory housing; a second reciprocal mechanical coupling connected with the first mechanical coupling; and a second reciprocal electrical coupling and mounted on the second reciprocal mechanical coupling wherein the second reciprocal electrical coupling is in electrical connection with the first electrical coupling.

In a fourth aspect of the present disclosure there is provided a power tool coupling assembly for connecting a power tool to a power tool accessory and mounted on a housing of the power tool, the power tool coupling assembly comprising: a first mechanical coupling connectable with a second reciprocal mechanical coupling on the power tool accessory; and a first electrical coupling in electrical connection with a power source of the power tool and mounted on the first mechanical coupling wherein the first electrical coupling is electrically connectable with a second reciprocal electrical coupling mounted on the second reciprocal mechanical coupling.

In a fifth aspect of the present disclosure there is provided an accessory coupling assembly for connecting a power tool accessory to a power tool and mounted on a housing of the power tool accessory, the accessory coupling assembly comprising: a second reciprocal mechanical coupling connectable with a first reciprocal mechanical coupling on the power tool; and a second reciprocal electrical coupling mounted on the second reciprocal mechanical coupling wherein the second reciprocal electrical coupling is electrically connectable with a first reciprocal electrical coupling mounted on the first reciprocal mechanical coupling wherein the first reciprocal electrical coupling is in electrical connection with a power source of the power tool.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
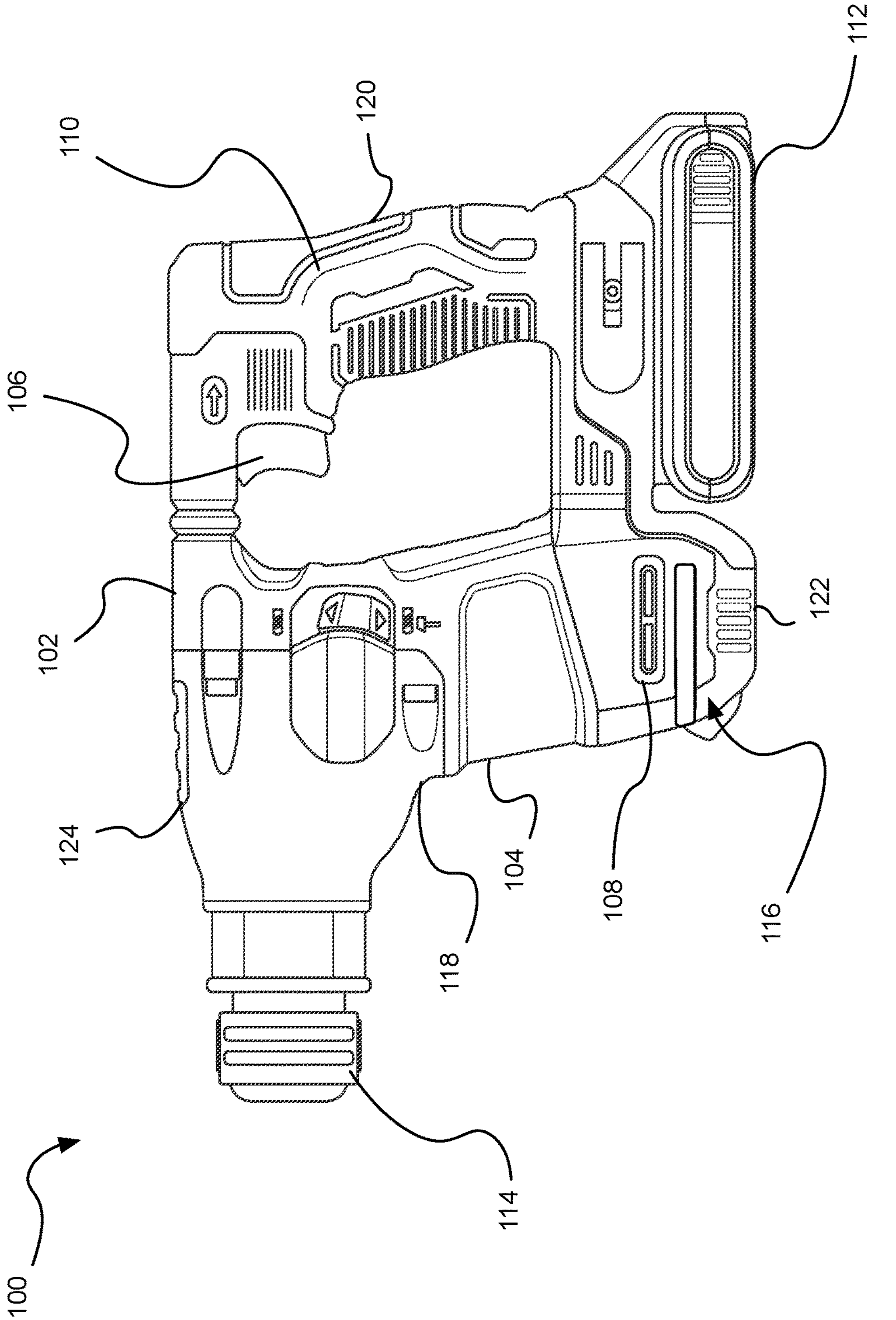
FIG. 1 shows a side view of a power tool according to an example.

FIG. 1 shows a side view of a power tool 100. The power tool 100 as shown in FIG. 1 is a hammer drill or a rotary hammer. Whilst FIG. 1 shows a hammer drill, in other examples any other type of power tool 100 can be used. For example, the power tool 100 can be a plunge saw, a reciprocating saw, a circular saw, an impact driver, a drill, a multitool, an oscillating tool, or any other power tool 100. Hereinafter the term "power tool" will be used to describe the rotary hammer, but this also refers to any other suitable power tool 100.

The power tool 100 comprises a power tool housing 102. The power tool housing 102 comprises a clam shell type construction having two halves which are fastened together. The halves of the power tool housing 102 are fastened together with screws but in alternative examples any suitable means for fastening the power tool housing 102 together may be used such as glue, clips, bolts and so on. For the purposes of clarity, the fastenings in the power tool housing 102 are not shown in FIG. 1.

An electric motor (not shown) is mounted in a motor housing portion 104 of the power tool housing 102. The motor housing portion 104 is integral with the power tool housing 102.

As shown in FIG. 1, the power tool housing 102 comprises a handle 110 for the user to grip during use. A trigger button 106 is mounted on the handle 110 which is used by the user to activate the electric motor (not shown). The electric motor is electrically connected to a battery pack 112. The battery pack 112 is optionally removably mountable to the power tool housing 102 at the base of the handle 110. In some examples, the battery pack 112 is integral to the power tool housing 102 and not removeable. Alternatively in other examples the power tool 100 is powered additionally or alternatively with mains power (not shown). Where the power tool 100 is powered with mains power, the power tool 100 optionally comprises a rectified for converting AC voltage to DC voltage. In this way, a power tool accessory 200 (as described hereinafter) configured for operation with a DC power source can be powered from the power tool 100.

The electric motor is rotatably coupled to a tool holder 114 via an output drive shaft (not shown). A cutting tool (not shown) such as a drill bit can be mounted in the tool holder 114. The motor housing portion 104 comprises one or more air vents 108 for cooling the motor. The air vents 108 allow the intake or exhaust of air to increase air circulation around the motor.

Figure 2:
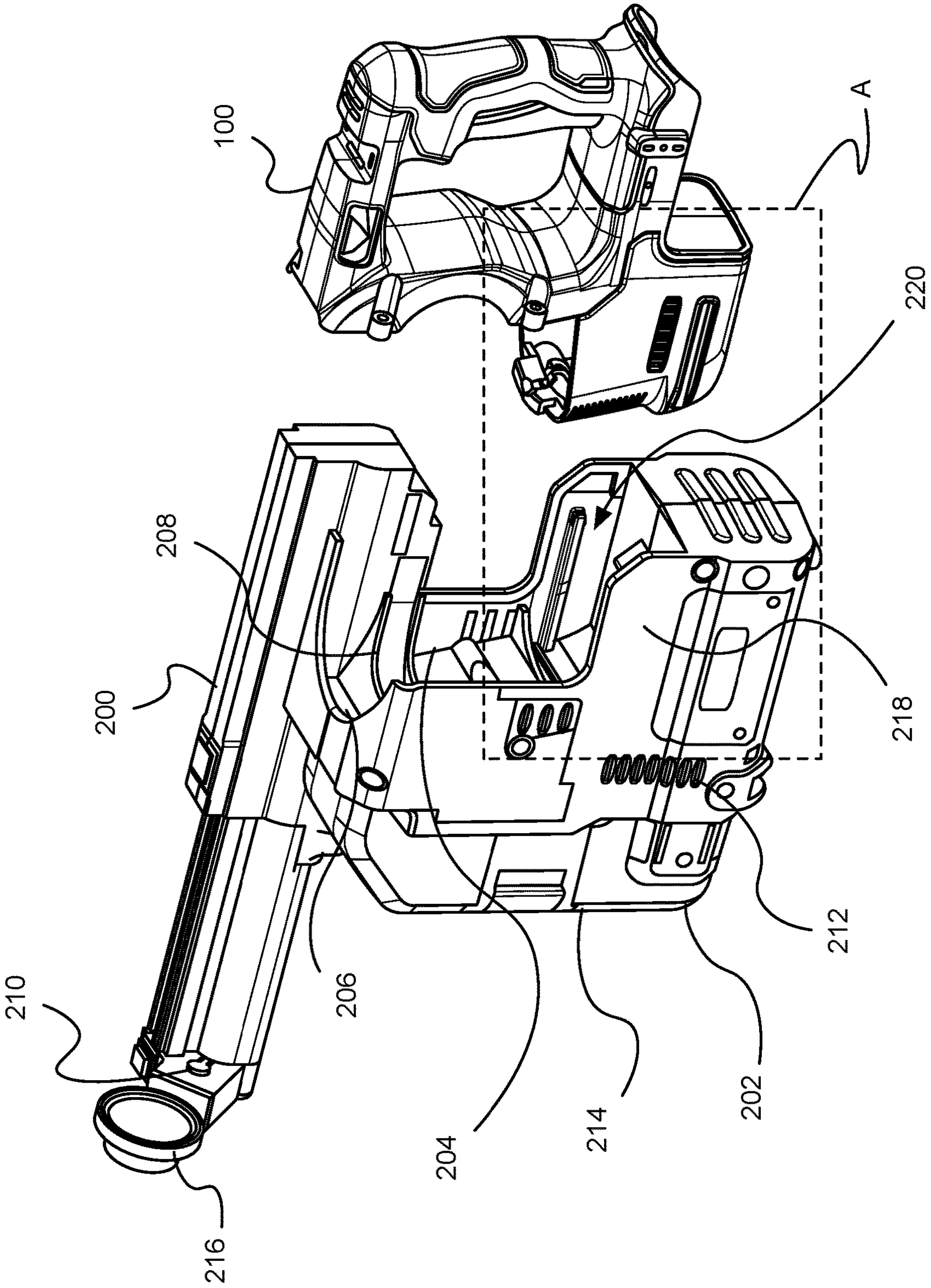
FIG. 2 shows an exploded perspective view of part of a power tool and a power tool accessory according to an embodiment.

In some examples a power tool coupling assembly 116 is located on the power tool housing 102 below the air vents 108. The power tool coupling assembly 116 is arranged to connect the power tool 100 to a power tool accessory 200 (as best shown in FIG. 2). The power tool coupling assembly 116 is arranged to mechanically and electrically connect the power tool 100 to the power tool accessory 200.

The power tool coupling assembly 116 as shown in FIG. 1 is integral with the power tool housing 102. In this way, the structure of the power tool coupling assembly 116 is optionally formed when the power tool housing 102 is moulded and the power tool coupling assembly 116 and the power tool housing 102 are a unitary element. However, in some other examples, the power tool coupling assembly 116 is optionally a separate component that is fixed to the surface of the power tool housing 102. Accordingly, reference to the power tool coupling assembly 116 being mounted on, located on etc the power tool housing 102 can mean the separate component fixed to the power tool housing 102 or an integral part of the power tool housing 102.

The power tool coupling assembly 116 in FIG. 1 is shown mounted on the motor housing portion 104 below the air vents 108. However, the power tool coupling assembly 116 can be mounted anywhere on the power tool housing 102.

By mounting the power tool coupling assembly 116 on the power tool 100 below the air vents 108, the power tool accessory 200 will not obstruct the airflow through the power tool 100 during use.

Turning to FIG. 2, the power tool accessory 200 and the power tool 100 will now be described in further detail. FIG. 2 shows an exploded perspective view of part of the power tool 100 and a power tool accessory 200 according to an example.

The power tool 100 as shown in FIG. 2 is partially represented for the purposes of clarity. Specifically, part of the motor housing portion 104 including the tool holder 114 is omitted from FIG. 2. The battery pack 112 is also not shown in FIG. 2.

The power tool accessory 200 as shown in FIG. 2 is a dust extractor. The dust extractor is arranged to remove dust from the vicinity of the tool holder 114 during operation of the power tool 100. However, in other examples, the power tool accessory 200 can be another suitable accessory mountable on the power tool 100.

For example, the power tool accessory 200 can be an illumination device, a laser indicator, or any other suitable accessory mechanically and electrically connectable to the power tool 100. In some other examples, the power tool accessory 200 can be additionally or alternatively a charging mount (not shown) for a mobile phone or a camera or other electronic accessory. The mount for the mobile phone or the camera can comprise a charging socket for charging the mobile phone, camera, or other electronic accessory. The mount can comprise a gripping mechanism for securing the mobile phone or the camera to the mount. The mount can comprise a moveable joint for angling the mobile phone or camera with respect to the power tool 100. This means that the mobile phone or camera can be positioned to take images or video footage of the operation of the power tool 100. Alternatively, the mobile phone can be used to display instructions or other information for the user of the power tool 100 during operation of the power tool 100. In some examples, the power tool accessory 200 can be light or torch. In this way the torch or light can be mounted to the power tool 100 and powered by the power tool 100. Hereinafter, the term “power tool accessory” 200 will be used to refer to the dust extractor, however this can also be used to describe any other suitable accessory.

The power tool accessory 200 is mountable on a front side 118 (as best shown in FIG. 1) of the power tool 100. This means that the user pushes the power tool 100 into the power tool accessory 200 in a direction towards the tool holder 114. In some other examples, the power tool accessory 200 is mountable on other parts and sides of the power tool 100. Although not shown, the power tool accessory 200 is mountable on a rear side 120 adjacent the handle 110, or the underside 122 adjacent the battery pack 112 or on a top side 124.

The power tool accessory 200 is removably mountable to the power tool 100. Accordingly, the user can mount the power tool accessory 200 to the power tool 100 to increases the versatility and functionality of the power tool 100 as needed by the user.

FIG. 2 shows the power tool accessory 200 having an accessory housing 202. Similar to the power tool housing 102, the accessory housing 202 comprises a clam shell type construction having two halves which are fastened together. The halves of the accessory housing 202 are fastened together with screws but in alternative examples any suitable means for fastening the accessory housing 202 together may be used such as glue, clips, bolts and so on. For the purposes of clarity, the fastenings in the accessory housing 202 are not shown in FIG. 2.

The accessory housing 202 comprises a central recess 204 for receiving the power tool housing 102 when the power tool accessory 200 is engaged with the power tool 100. The central recess 204 comprises one or more curved walls 206 shaped to complement the shape of the power tool housing 102. The central recess 204 can optionally comprise curved ribs 208 also arranged to engage the power tool housing 102. The central recess 204 optionally comprises projecting side walls 218 for overlapping with at least a portion of the power tool housing 102. When the power tool accessory 200 is mounted on the power tool 100, the side walls 218 overlap the power tool housing 102 and help limit the movement of the power tool 100 with respect to the power tool accessory 200.

The power tool accessory 200 as shown in FIG. 2 comprises a motor-fan assembly (not shown) mounted in the accessory housing 202. The motor-fan assembly is arranged to generate an air flow from a dirty air inlet 210 to a clean air outlet 212. The dirty air inlet 210 is adjacent to a tool collar 216 arranged to surround the cutting tool mounted in the tool holder 114. The power tool accessory 200 comprises a removeable dirt container 214 for capturing dirt entrained in the airflow.

In some examples an accessory coupling assembly 220 is located on the accessory housing 202 in the central recess 204. The accessory coupling assembly 220 is arranged to connect the power tool accessory 200 to the power tool 100. The accessory coupling assembly 220 is arranged to mechanically and electrically connect the power tool accessory 200 to the power tool 100.

The accessory coupling assembly 220 as shown in FIG. 2 is optionally integral with the accessory housing 202. In this way, the structure of accessory coupling assembly 220 is formed when the accessory housing 202 is moulded and the accessory coupling assembly 220 and accessory housing 202 are a unitary element. However, in some other examples, the accessory coupling assembly 220 is optionally a separate component that is fixed to the surface of the accessory housing 202. Accordingly, reference to the accessory coupling assembly 220 being mounted on, located on etc the accessory housing 202 can mean the separate component fixed to the power tool housing 102 or an integral part of the accessory housing 202.

Figure 3:
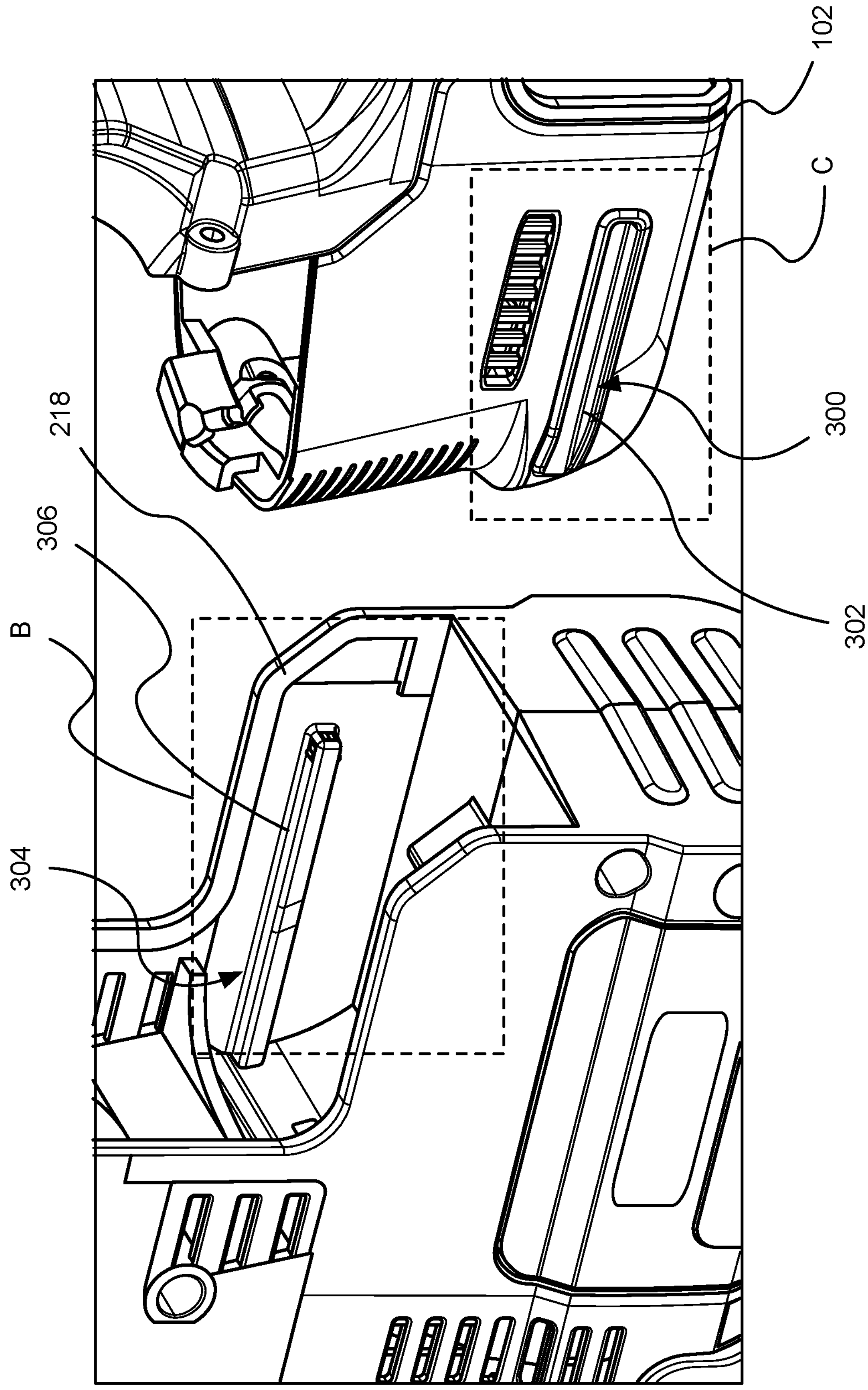
FIG. 3 shows a close-up perspective view of a power tool and a power tool accessory according to an embodiment.
Figure 4:
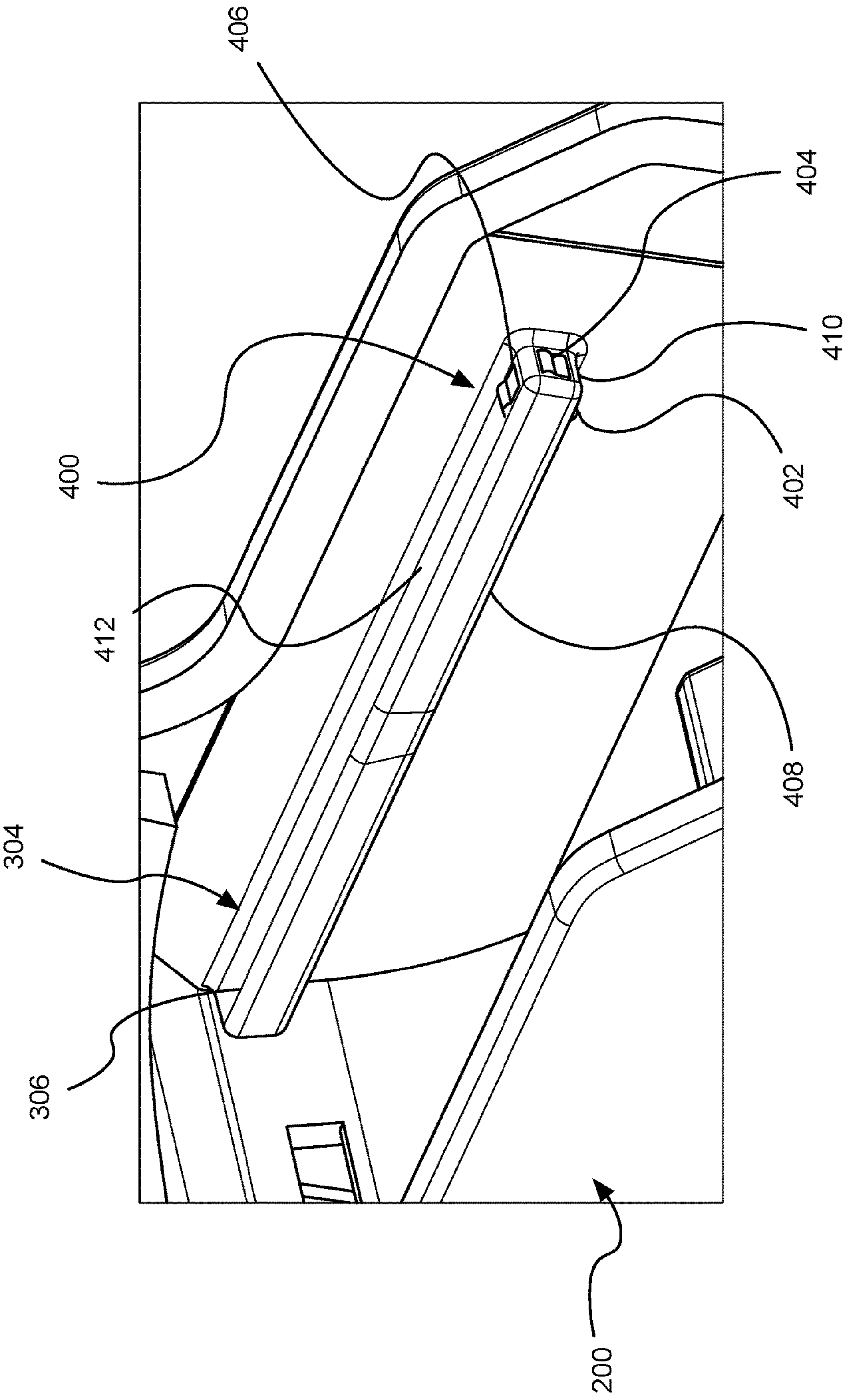
FIG. 4 shows a close-up perspective view of a power tool accessory according to an embodiment.
Figure 5:
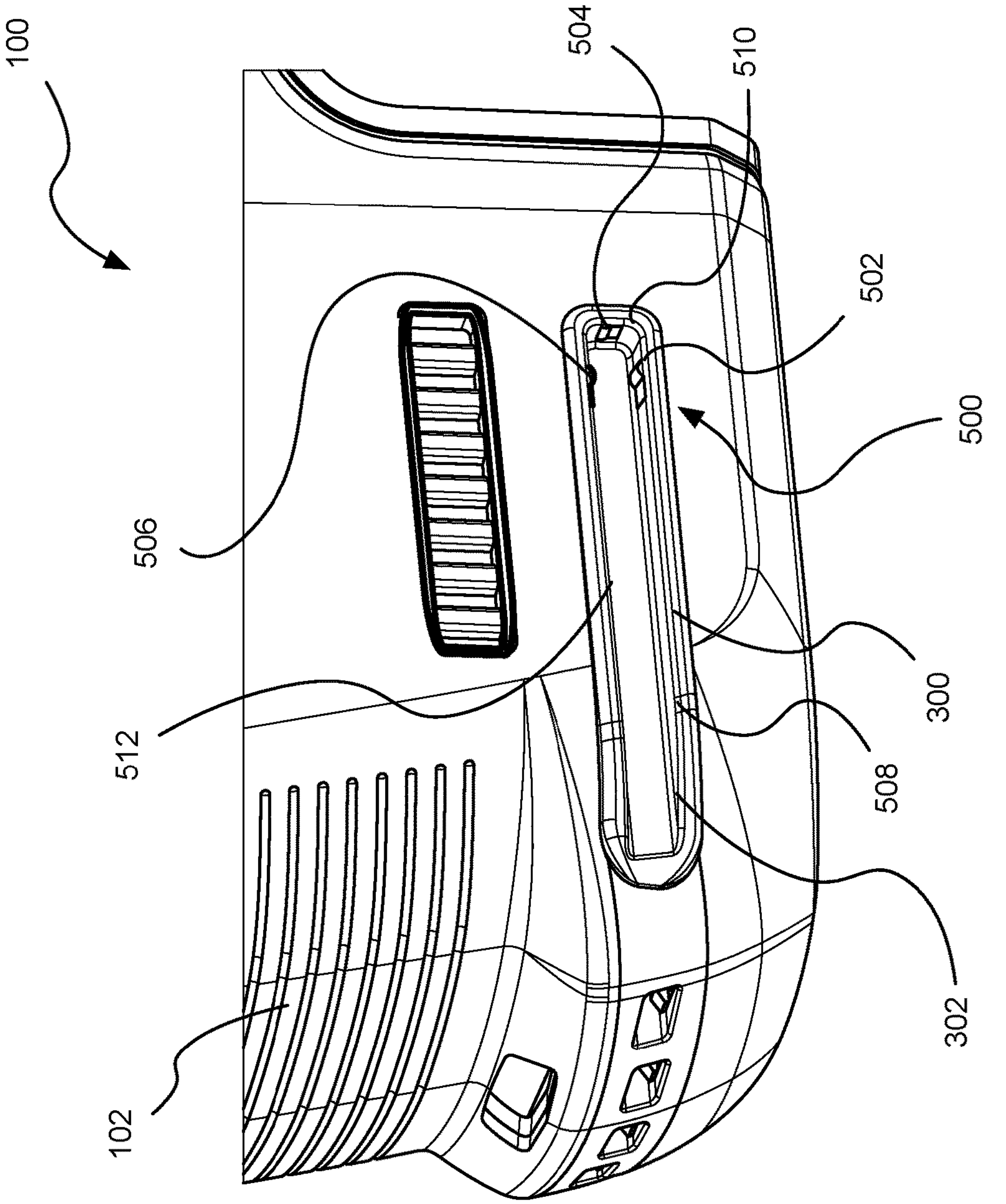
FIG. 5 shows a close-up perspective view of a power tool according to an embodiment.

Turning to FIGS. 3, 4 and 5, the engagement between the power tool 100 and the power tool accessory 200 will now be discussed in more detail. FIG. 3 shows a close-up perspective view of the power tool 100 and the power tool accessory 200 according to an example. FIG. 3 is a close up of FIG. 2 as indicated by the dotted box labelled A in FIG. 2. FIG. 4 shows a close-up perspective view of the power tool accessory 200 as indicated by the dotted box labelled B in FIG. 3. FIG. 5 shows a close-up perspective view of a power tool 100 as indicated by the dotted box labelled C in FIG. 3.

The power tool housing 102 comprises a first mechanical coupling 300. The first mechanical coupling 300 as shown in FIG. 3 is a first slot 302. In some examples, the first mechanical coupling 300 comprises a pair of slots 302, 700 on either side of the power tool housing 102.

Figure 7:
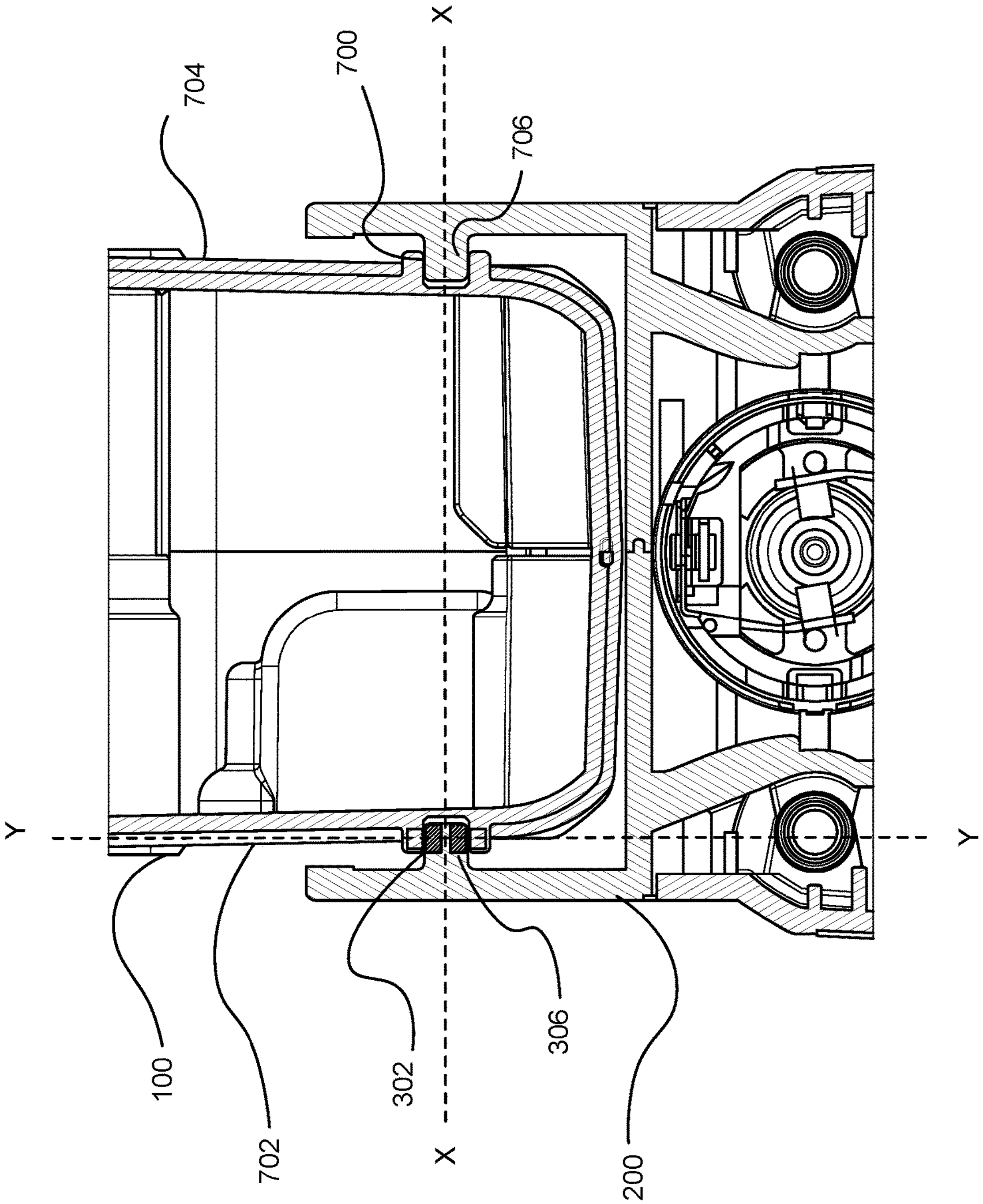
FIG. 7 shows another partial cross-sectional view of a power tool and a power tool accessory according to an embodiment.

The pair of slots 302, 700 are best shown in FIG. 7. FIG. 7 shows another partial cross-sectional view of the power tool 100 and the power tool accessory 200 according to an example. Accordingly, the first slot 302 is positioned on a first side 702 of the power tool housing 102 and a second slot

700 is positioned on a second side 704 of the power tool housing 102. As can be seen from FIG. 7, the first slot 302 and the second slot 700 are positioned along the axis X-X. The first slot 302 and the second slot 700 are located on opposite sides 702, 704 of the power tool housing 102. In this way, the first and second slots 302, 700 limit the movement of the power tool 100 with respect to the power tool accessory 200 when the power tool 100 is mounted to the power tool accessory 200.

Whilst FIG. 7 shows the first mechanical coupling 300 mounted on the power tool housing 102 comprise a first slot 302 and a second slot 700, in other examples different mechanical coupling mechanisms can be used. For example, in some alternatives the first mechanical coupling 300 comprises a single slot (not shown). In this example with a single slot, the single slot may optionally comprise a "T" cross-sectional shape or an "I" cross-sectional shape.

In some other examples, there are additional slots mounted on the power tool housing 102 in addition to the first and second slots 302, 700. Indeed, there can be any number of slots to increase the frictional forces between the power tool 100 and the power tool accessory 200.

Turning back to FIG. 3, the mechanical engagement between the power tool 100 and the power tool accessory 200 will be further discussed.

The power tool accessory 200 comprises second reciprocal mechanical coupling 304. The second reciprocal mechanical coupling 304 is connectable with the first mechanical coupling 300 on the power tool 100.

The second reciprocal mechanical coupling 304 as shown in FIG. 3 is a first rail 306 projecting from side wall 218 of the accessory housing 202. The first rail 306 is arranged to mechanically engage the first slot 302. In some examples, the second reciprocal mechanical coupling 304 comprises a pair of rails 306, 706 on either side wall 218 of the accessory housing 202. Similarly, the first and second rails 306, 706 are arranged to respectively mechanically engage the first and second slots 302, 700.

The pair of rails 306, 706 are best shown in FIG. 7. Accordingly, the first rail 306 is positioned on the first side 702 of the power tool housing 102 and a second rail 706 is positioned on the second side 704 of the power tool housing 102. As can be seen from FIG. 7, the first rail 306 and the second rail 706 are positioned along the axis X-X. The first rail 306 and the second rail 706 are located on opposite sides 702, 704 of the accessory housing 202. In this way, the first and second rails 306, 706 limit the movement of the power tool 100 with respect to the power tool accessory 200 when the power tool 100 is mounted to the power tool accessory 200.

The first mechanical coupling 300 and the second reciprocal mechanical coupling 304 engage each other. A frictional force between the first mechanical coupling 300 and the second reciprocal mechanical coupling 304 prevents the first mechanical coupling 300 and the second reciprocal mechanical coupling 304 from accidentally separating. In some other examples, in additional to the frictional forces between the first mechanical coupling 300 and the second reciprocal mechanical coupling 304 optionally one or more mechanisms for providing a positive engagement are provided. For example, a detent (not shown) on the first or second rails 306, 706 can engage with reciprocal recess on the first or second slots 302, 700. Additionally, or alternatively, the power tool accessory 200 can be secured to the power tool 100 with clips or a latch mechanism (not shown).

In the previously mentioned example where the first mechanical coupling 300 comprises a single slot (not shown), a single rail (not shown) is also provided on one side of the power tool accessory 200. In this example with a single slot, the single slot may optionally comprise a "T" cross-sectional shape or an "I" cross-sectional shape. Similarly, the single rail comprises a reciprocal "T" cross-sectional shape or an "I" cross-sectional shape for a sliding fit into the single rail.

As shown in Figures, the first mechanical coupling 300 and the second reciprocal mechanical coupling 304 are respectively a pair of slots 302, 700 and a pair of rails 306, 706. However, in alternative examples not illustrated in the Figure, the first mechanical coupling 300 on the power tool housing 102 comprises a pair of rails. Similarly, the second reciprocal mechanical coupling 304 comprises a pair of slots. Furthermore, in some alternative examples, the first mechanical coupling 300 and the second reciprocal mechanical coupling 304 each comprise one slot and one rail.

In addition to the previously described mechanical engagement, the power tool coupling assembly 116 and the accessory coupling assembly 220 are electrically connectable. The electrical connection between the power tool 100 and the power tool accessory 200 will now be discussed.

The power tool coupling assembly 116 comprises a first electrical coupling 500 as shown in FIG. 5. The first electrical coupling 500 is in electrical connection with the battery pack 112. This means that the power tool 100 can supply power to the power tool accessory 200 when electrically connected to the first electrical coupling 500.

The first electrical coupling 500 is mounted on the first mechanical coupling 300. FIG. 5 shows a plurality of electrical contacts e.g. a first electrical contact 502, a second electrical contact 504, and a third electrical contact 506. The plurality of electrical contacts 502, 504, 506 are mounted on different surfaces of the first slot 302. In some examples, the first electrical contact 502, the second electrical contact 504, and the third electrical contact 506 are respectively mounted on a lower slot surface 508, a vertical slot surface 510 and an upper slot surface 512. By locating the plurality of electrical contacts 502, 504, 506 on different surfaces of the first slot 302, the power tool accessory 200 is not able to accidentally short circuit across the incorrect electrical contact when mounting the power tool accessory 200 on the power tool 100.

In some examples, the plurality of electrical contacts 502, 504, 506 are spring biased for engagement with a reciprocal electrical contact. As can be seen from FIG. 5, the first electrical contact 502, the second electrical contact 504, and the third electrical contact 506 comprise a flat plate portion connected to a spring biased free end. However, in some alternative examples the first electrical contact 502, the second electrical contact 504, and the third electrical contact 506 are flat metal plates.

Similarly, the accessory coupling assembly 220 as shown in FIG. 4 comprises a second reciprocal electrical coupling 400 as shown in FIG. 4. When the first electrical coupling 500 is electrically connected with the second reciprocal electrical coupling 400, the power tool accessory 200 receives power from the power source of the power tool 100. In some examples this is a battery pack 112, but in other examples this is mains voltage.

The second reciprocal electrical coupling 400 is mounted on the second reciprocal mechanical coupling 304. FIG. 4 shows a plurality of reciprocal electrical contacts 402, 404, 406 e.g. a first reciprocal electrical contact 402, a second reciprocal electrical contact 404, and a third reciprocal electrical contact 406. The plurality of reciprocal electrical contacts 402, 404, 404 are mounted on different surfaces of the first rail 306. In some examples, the first reciprocal electrical contact 402, the second reciprocal electrical contact 404, and the third reciprocal electrical contact 406 are respectively mounted on a lower rail surface 408, a vertical rail surface 410 and an upper rail surface 412. By locating the plurality of reciprocal electrical contacts 402, 404, 406 on different surfaces of the first rail 306, the power tool accessory 200 is not able to accidentally short circuit across the incorrect electrical contact when mounting the power tool accessory 200 on the power tool 100.

Figure 6:
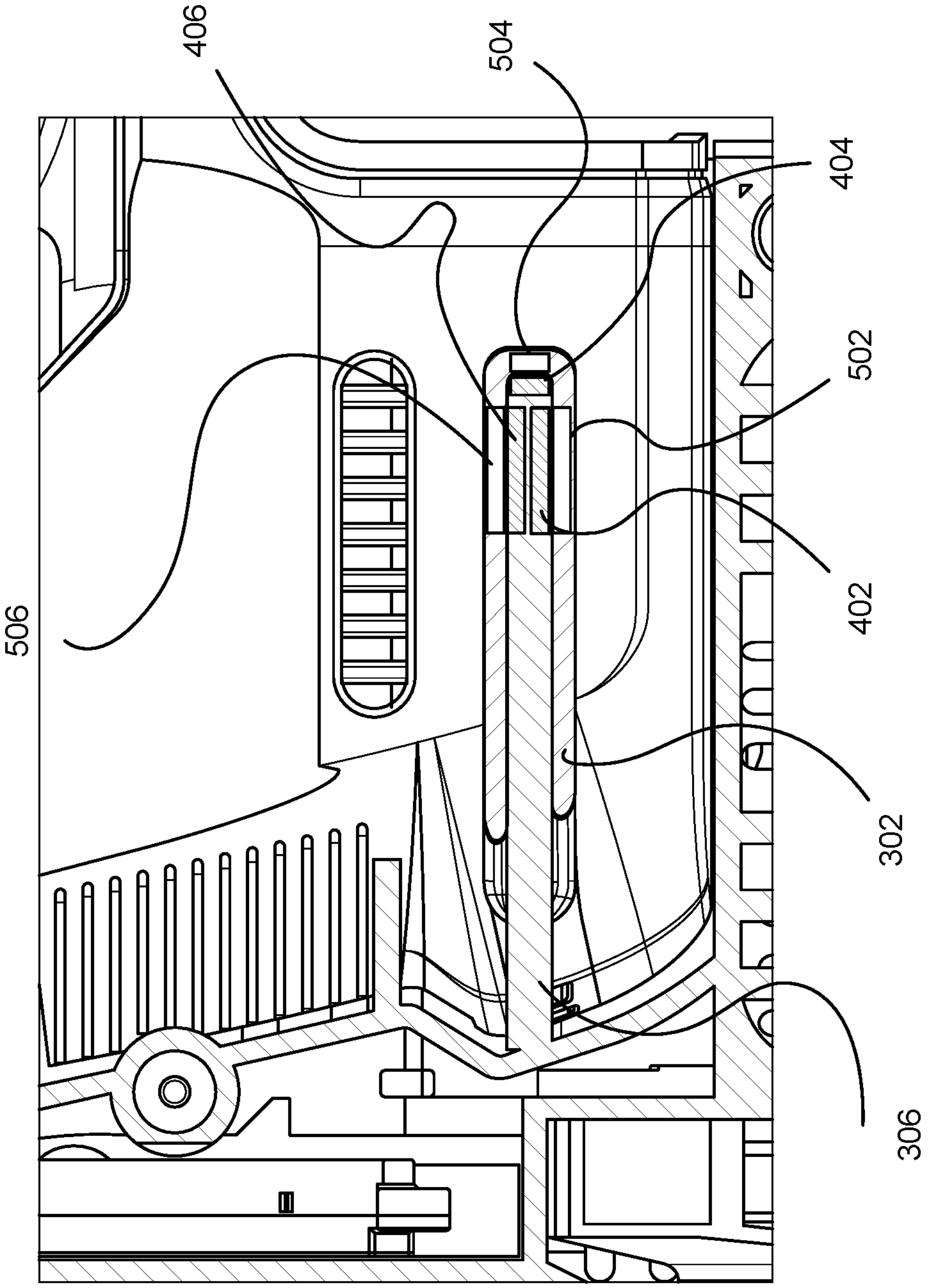
FIG. 6 shows a partial cross-sectional view of a power tool and a power tool accessory according to an embodiment.

Accordingly, the first reciprocal electrical contact 402, the second reciprocal electrical contact 404, and the third reciprocal electrical contact 406 are arranged to electrically connect respectively to the first electrical contact 502, the second electrical contact 504, and the third electrical contact 506. This is best shown in FIG. 6 which shows the power tool 100 and the power tool accessory 200 in mechanical and electrical engagement. FIG. 6 shows a partial cross-sectional view of the power tool 100 and the power tool accessory 200 along the axis Y-Y in FIG. 7.

In some examples, the first reciprocal electrical contact 402 and the first electrical contact 502 and the second reciprocal electrical contact 404 and the second electrical contact 504 are configured to transmit power from the battery pack 112 to the power tool accessory 200. In some examples, the third reciprocal electrical contact 406 and the third electrical contact 506 are configured to provide information about the power tool accessory 200 to a controller (not shown) of the power tool accessory 200 and/or the power tool 100.

In some examples, the third reciprocal electrical contact 406 and the third electrical contact 506 provide an ON/OFF signal that the indicates whether the power tool accessory 200 is mounted to the power tool 100. In some other examples, the third reciprocal electrical contact 406 and the third electrical contact 506 are a data connection between the power tool accessory 200 and the power tool 100. In this way, status information or any other information of the power tool accessory 200 and the power tool 100 can be transmitted between the power tool accessory 200 and the power tool 100. This can help the power tool 100 manage the power requirements of the power tool 100 and the power tool accessory 200 during operation.

As shown in FIGS. 6 and 7, the plurality of electrical contacts 502, 504, 506 are mounted on the first slot 302 and the plurality of reciprocal electrical contacts 402, 404, 406 are mounted on the first rail 306. This keeps the routing of the electrical wiring within the power tool accessory 200 simpler. However, in some examples only some of the plurality of electrical contacts 502, 504, 506 and the plurality of reciprocal electrical contacts 402, 404, 406 are mounted on the first slot 302 and the first rail 306. At the same time one of the plurality of electrical contacts 502, 504, 506 and one of the plurality of reciprocal electrical contacts 402, 404, 406 are respectively mounted on the second slot 700 and the second rail 706. By mounting some of the plurality of electrical contacts 502, 504, 506 and the plurality of reciprocal electrical contacts 402, 404, 406 on each of the first slot 302, the first rail 306, the second slot 700 and the second rail 706, this again reduces the chances of accidentally causing a short circuit when the power tool accessory 200 is mounted on the power tool 100.

As can be seen from FIG. 4, the first reciprocal electrical contact 402, the second reciprocal electrical contact 404, and the third reciprocal electrical contact 406 comprise a flat plate portion connected to a spring biased free end. However, in some alternative examples the first reciprocal electrical contact 402, the second reciprocal electrical contact 404, and the third reciprocal electrical contact 406 are flat metal plates.

In some examples, the first electrical coupling 500 and the second reciprocal electrical coupling 400 are mounted on surfaces such that the first electrical coupling 500 and the second reciprocal electrical coupling 400 do not project outwardly from the power tool housing 102 or the accessory housing 202. Accordingly, when either the power tool 100 or the power tool accessory is placed on a surface, the first electrical coupling 500 and the second reciprocal electrical coupling 400 are protected. This improves the lifetime of the electrical connection between the power tool 100 and the power tool accessory 200.

Figure 8:
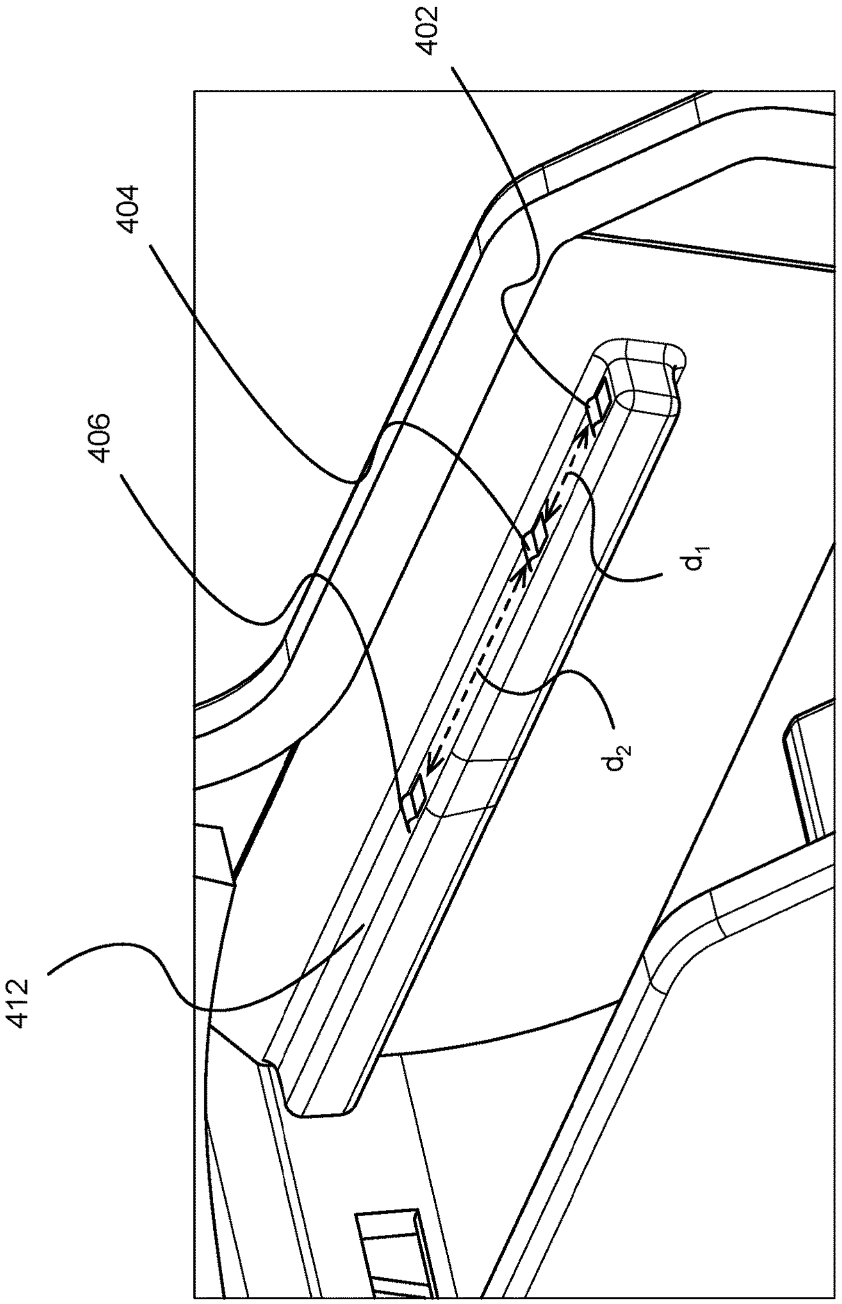
FIG. 8 shows a close-up perspective view of a power tool accessory according to an embodiment.
Figure 9:
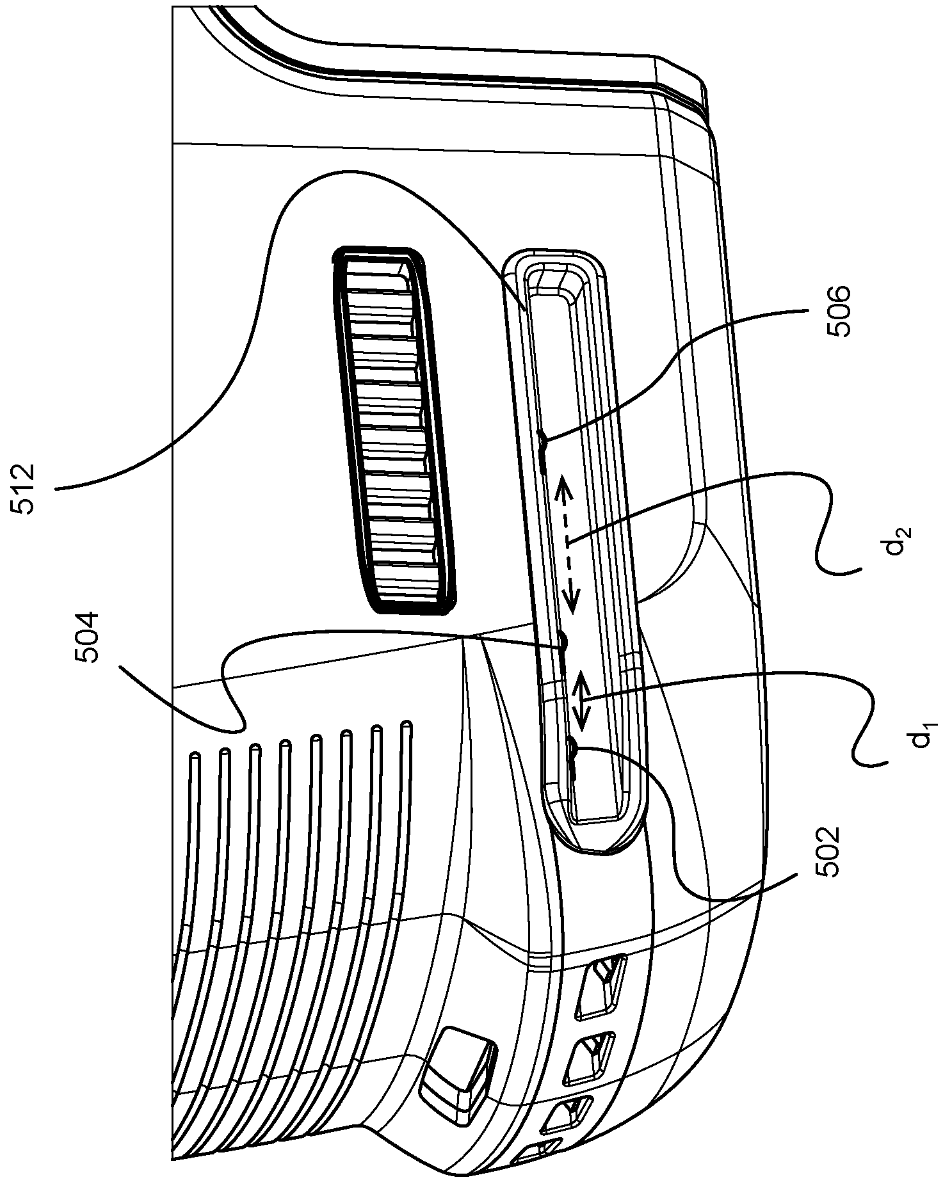
FIG. 9 shows a close-up perspective view of a power tool according to an embodiment.

Turning to FIGS. 8 and 9, an alternative example will now be discussed. FIG. 8 shows a close-up perspective view of the power tool accessory 200 according to an example and FIG. 9 shows a close-up perspective view of the power tool 100 according to an example. The example shown in FIGS. 8 and 9 is the same as discussed with respect to the previous Figures except that the arrangement of the plurality of electrical contacts 502, 504, 506 and the plurality of reciprocal electrical contacts 402, 404, 406 is different.

The plurality of electrical contacts 502, 504, 506 are mounted on the upper slot surface 512 as shown in FIG. 9. The plurality of reciprocal electrical contacts 402, 404, 406 are mounted on the upper rail surface 412. In this way, the plurality of the electrical contacts 502, 504, 506 are all mounted on the same surface. Likewise, the plurality of reciprocal electrical contacts 402, 404, 406 are all mounted on the same surface.

The plurality of electrical contacts 502, 504, 506 are not equally spaced along the upper slot surface 512. Indeed, the first electrical contact 502 and the second electrical contact 504 are separated by a first distance d1. The second electrical contact 504 and the third electrical contact 506 are separated by a second distance d2. In some examples, the first and the second distances d1, d2 are not equal. As shown in FIG. 9, the first distance d1 is less than the second distance d2. Alternatively, the first distance d1 is greater than the second distance d2.

Turning to FIG. 8, likewise the plurality of reciprocal electrical contacts 402, 404, 406 are not equally spaced along the upper rail surface 412. Similarly, the first reciprocal electrical contact 402 and the second reciprocal electrical contact 404 are separated by the first distance d1. The second reciprocal electrical contact 404 and the third reciprocal electrical contact 406 are separated by the second distance d2.

Accordingly, when mounting the power tool accessory 200 on the power tool 100, the plurality of electrical contacts 502, 504, 506 and the plurality of reciprocal electrical contacts 402, 404, 406 will not accidentally short circuit.

Figure 10:
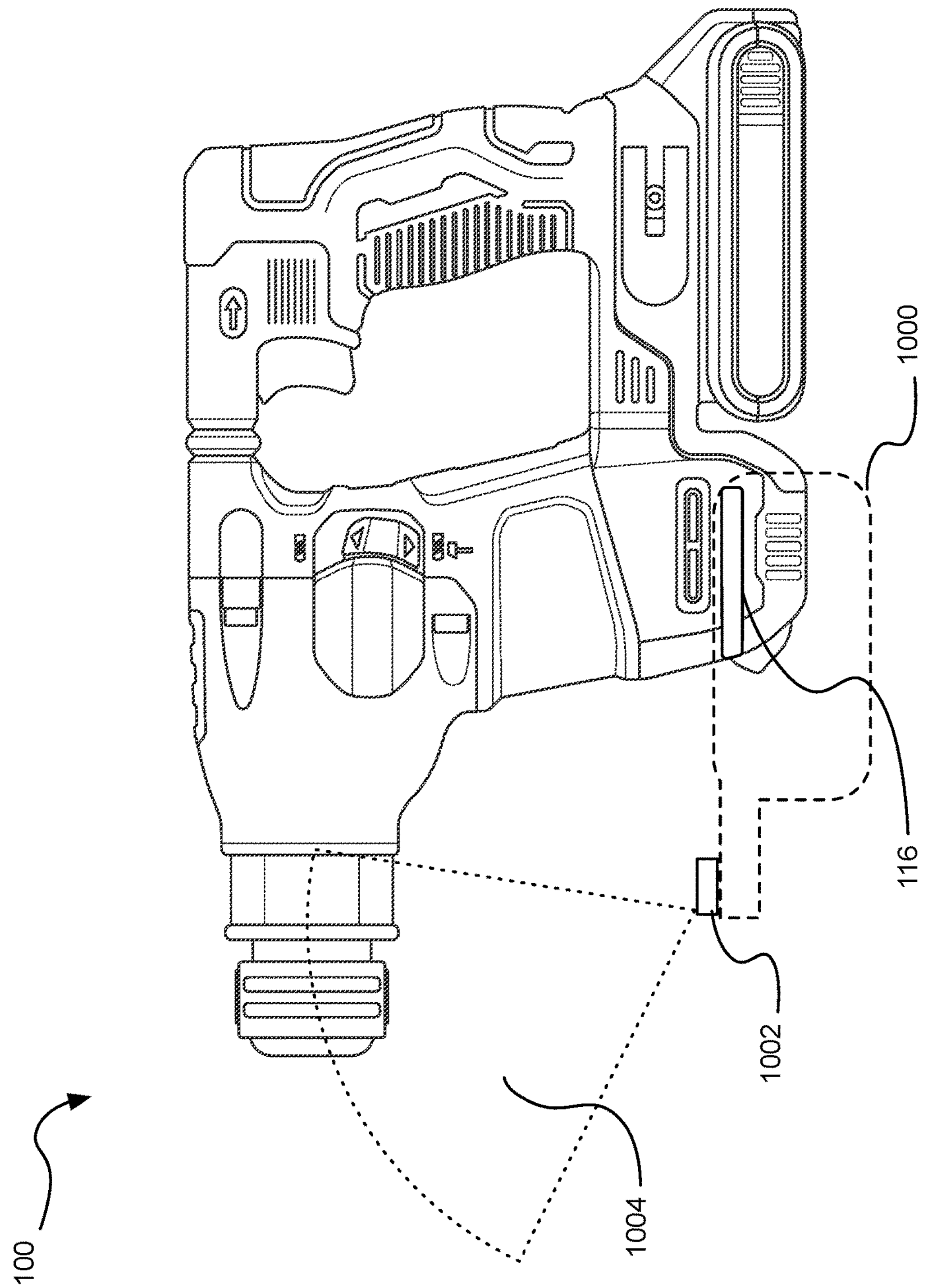
FIG. 10 shows a side view of a power tool and a power tool accessory according to an embodiment.

Another example will be discussed with reference to FIG. 10. FIG. 10 shows a side view of the power tool 100 and a power tool accessory 1000 according to an example.

The example as shown in FIG. 10 is the same as discussed in reference to the previous examples, however the power tool accessory 1000 is a different power tool accessory. The power tool accessory 1000 engages the power tool 100 using the same mechanical and electrical features as discussed in the previous examples.

In FIG. 10 the power tool accessory 1000 comprises an illumination device 1002 which illuminates and area 1004 around the tool holder 114 and the cutting tool. This means that the user can better see the workpiece during operation of the power tool 100. Alternatively, the illumination device 1002 can be a laser indicator arranged to display a target intersection point on the workpiece. As can be seen from FIG. 10, the power tool accessory 1000 comprises a smaller form factor when compared to the power tool accessory 200 as shown in the previous examples.

In another example, two or more examples are combined. Features of one example can be combined with features of other examples.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
- a power source;
- a power tool housing comprising a first mechanical coupling connectable with a second reciprocal mechanical coupling on a power tool accessory; and
- a first electrical coupling in electrical connection with the power source and mounted on the first mechanical coupling, wherein the first electrical coupling is electrically connectable with a second reciprocal electrical coupling on the power tool accessory,
- wherein the first mechanical coupling comprises a first slot or a first rail, and the first electrical coupling comprises a first electrical contact mounted in the first slot or on the first rail.

2. The power tool of claim 1, wherein the first slot or the first rail of the first mechanical coupling configured to couple with a second rail or a second slot of the second reciprocal mechanical coupling.

3. The power tool of claim 1, wherein the first mechanical coupling is the first slot and the second reciprocal mechanical coupling is the second rail.

4. The power tool of claim 1, wherein the first mechanical coupling comprises the first slot on a first side of the power tool housing and a second slot on a second side of the power tool housing, the first slot and the second slot respectively configured to couple with a first rail of the second reciprocal mechanical coupling on the first side of the power tool housing and a second rail of the second reciprocal mechanical coupling on the second side of the power tool housing.

5. The power tool of claim 1, wherein the first electrical contact comprises a plurality of first electrical contacts configured to engage a plurality of second electrical contacts of the second reciprocal electrical coupling.

6. The power tool of claim 5, wherein the plurality first electrical contacts of the first electrical coupling are mounted on the same surface of the first mechanical coupling.

7. The power tool of claim 5, wherein the plurality of second electrical contacts of the second reciprocal electrical coupling are mounted on the same surface of the second reciprocal mechanical coupling.

8. The power tool of claim 5, wherein a first distance between a first pair of the plurality of first electrical contacts of the first electrical coupling and a first pair of the plurality of second electrical contacts of the second reciprocal electrical coupling is different from a second distance between a second pair of the plurality of first electrical contacts of the first electrical coupling and a second pair of the plurality of second electrical contacts of the second reciprocal electrical coupling.

9. The power tool of claim 5, wherein the plurality of first electrical contacts of the first electrical coupling and the plurality of second electrical contacts of the second reciprocal electrical coupling are respectively mounted on a plurality of different surfaces of the first mechanical coupling and a plurality of different surfaces of the second reciprocal mechanical coupling.

10. The power tool of claim 5, wherein one of the plurality of first electrical contacts and the plurality of second electrical contacts comprise metal plates.

11. The power tool of claim 10, wherein the other of the plurality of first electrical contacts and the plurality of second electrical contacts comprise metal springs.

12. The power tool of claim 5, wherein at least one of the plurality of first electrical contacts is arranged to transmit data between the power tool and the power tool accessory.

13. The power tool of claim 1, wherein the power tool is one of a rotary hammer, a diamond core drill, hammer drill, a router, a reciprocating saw, plunge saw, a circular saw, an impact driver, a drill, a hammer drill, a multitool, an oscillating tool, or a chipping hammer.

14. The power tool of claim 1, wherein the power source is a battery mountable to the power tool housing.

15. The power tool of claim 1, wherein the second mechanical coupling is a slot or a rail, and wherein the second electrical coupling comprises a second electrical contact mounted in the slot or on the rail.

16. The power tool of claim 1, wherein the power tool and the power tool accessory are only mechanically coupled together with the first mechanical coupling and the second mechanical coupling.

17. A power tool accessory mountable on a power tool comprising:
- an accessory housing comprising a second reciprocal mechanical coupling connectable with a first reciprocal mechanical coupling on the power tool; and
- a second reciprocal electrical coupling mounted on the second reciprocal mechanical coupling wherein the second reciprocal electrical coupling is electrically connectable with a first reciprocal electrical coupling on power tool, wherein the first reciprocal electrical coupling is in electrical connection with a power source of the power tool,
- wherein the second reciprocal mechanical coupling comprises a slot or a rail, and the second reciprocal electrical coupling comprises an electrical contact mounted in the slot or on the rail.

18. The power tool of claim 17, wherein the power tool accessory is one of a dust extractor, a water pump, a laser indicator, or an illumination device.

19. A power tool assembly comprising:
- a power tool having:
  - a power tool housing;
  - a power source;
  - a first mechanical coupling on the housing; and
  - a first electrical coupling in electrical connection with the power source and mounted on the first mechanical coupling; and
- a power tool accessory having:
  - an accessory housing;
  - a second reciprocal mechanical coupling connected with the first mechanical coupling; and a second reciprocal electrical coupling and mounted on the second reciprocal mechanical coupling, wherein the second reciprocal electrical coupling is in electrical connection with the first electrical coupling, wherein the first mechanical coupling comprises a first slot or a first rail, and the first electrical coupling comprises a first electrical contact mounted in the first slot or on the first rail.

20. The power tool assembly of claim 19, wherein the second mechanical coupling comprises a second slot or a second rail, and the second electrical coupling comprises a second electrical contact mounted in the second slot or on the second rail.

* * * * *